(12) United States Patent
Böttcher et al.

(10) Patent No.: US 12,372,766 B2
(45) Date of Patent: Jul. 29, 2025

(54) DEVICE FOR ACQUIRING IMAGES OF A SURFACE

(71) Applicant: BST GmbH, Bielefeld (DE)

(72) Inventors: Frank Böttcher, Verl (DE); Peter Greve, Belm (DE); Stefan Meinhardt, Bielefeld (DE); Klaus Reckefuss, Leopoldshöhe (DE)

(73) Assignee: BST GmbH, Bielefeld (DE)

( * ) Notice: Subject to any disclaimer, the term of this patent is extended or adjusted under 35 U.S.C. 154(b) by 141 days.

(21) Appl. No.: 18/039,050

(22) PCT Filed: Dec. 1, 2021

(86) PCT No.: PCT/EP2021/083698
§ 371 (c)(1),
(2) Date: May 26, 2023

(87) PCT Pub. No.: WO2022/128460
PCT Pub. Date: Jun. 23, 2022

(65) Prior Publication Data
US 2024/0210668 A1    Jun. 27, 2024

(30) Foreign Application Priority Data
Dec. 14, 2020    (EP) .................................... 20213782

(51) Int. Cl.
*G02B 21/00* (2006.01)
*G02B 3/14* (2006.01)
(Continued)

(52) U.S. Cl.
CPC .......... *G02B 21/0016* (2013.01); *G02B 3/14* (2013.01); *G03B 3/12* (2013.01); *H04N 23/56* (2023.01); *G03B 2205/0046* (2013.01)

(58) Field of Classification Search
CPC .... G02B 21/0016; G02B 3/14; G02B 21/084; G02B 7/08; G02B 21/241; G03B 3/12;
(Continued)

(56) References Cited

U.S. PATENT DOCUMENTS

2016/0021285 A1\* 1/2016 Nadler ................... H04N 23/56
348/84
2016/0075153 A1\* 3/2016 Reckefuss .......... G01N 21/8901
347/16

(Continued)

FOREIGN PATENT DOCUMENTS

| CN | 109318235 A | 2/2019 |
|---|---|---|
| EP | 1940141 A1 | 2/2008 |
| EP | 2837957 B1 | 8/2013 |

OTHER PUBLICATIONS

Martin, Daryl, A Practical Guide to Machine Vision Lighting, Oct. 1, 2007, pp. 1-8.

(Continued)

*Primary Examiner* — Albert H Cutler
(74) *Attorney, Agent, or Firm* — Richard M. Goldberg

(57) ABSTRACT

The invention relates to a device for acquiring images of a surface (12) with different spatial resolution, the device including a camera (16) having an optical system (18) that can be focused onto the surface, a mechanical system (20) which is designed to vary the distance between the camera (16) and the surface (12) and wherein the optical system (18) includes a liquid lens (26) having an electronically adjustable focal length.

6 Claims, 1 Drawing Sheet

(51) Int. Cl.
*G03B 3/12* (2021.01)
*H04N 23/56* (2023.01)

(58) Field of Classification Search
CPC ............ G03B 2205/0046; G03B 13/36; H04N 23/56; H04N 23/55; H04N 23/67; H04N 23/50; H04N 23/555; H04N 23/57; H04N 23/58; G01N 21/86; G01N 21/89; G01N 21/8915; G01N 21/8983; G01N 2223/642
USPC .............. 348/86, 88, 92, 125, 128, 131, 132
See application file for complete search history.

(56) References Cited

U.S. PATENT DOCUMENTS

| | | | |
|---|---|---|---|
| 2019/0011557 A1* | 1/2019 | Weber | G02B 7/04 |
| 2019/0049391 A1* | 2/2019 | Kleindorp | H04N 23/56 |
| 2019/0339212 A1* | 11/2019 | Zhang | G06T 7/001 |
| 2020/0240925 A1 | 7/2020 | Putman et al. | |
| 2020/0304553 A1* | 9/2020 | Luo | H04L 65/65 |

OTHER PUBLICATIONS

Nandini, V. et al., A Review on Applications of Machine Vision Systems in Industries, Indian Journal of Science & Technology, IN, vol. 9, No. 48, Dec. 29, 2016, pp. 1-6.
Anonymous, Linear Motor, Wikipedia, Dec. 11, 2020, pp. 1-10.
Ventura, Mark, Focus Tunable Liquid Lenses and How to Integrate Them in Machine Vision Systems, Oct. 31, 2019, pp. 1-40.

* cited by examiner

DEVICE FOR ACQUIRING IMAGES OF A SURFACE

BACKGROUND OF THE INVENTION

The invention relates to a device for acquiring images of a surface with different spatial resolution, the device comprising a camera having an optical system that can be focused onto the surface.

In the fabrication or processing of material webs, for example in fabrication of textile webs or in printing on media webs in a rotary printing press, it is frequently necessary or desired to monitor the condition of the web with a camera system. In case of a running web, it is possible to record individual freeze frame images or optionally a video sequence. In web monitoring in printing presses, the image frequency is usually synchronized with the repeat of the formats that have been printed onto the web, so that a fixed image is formed according to the stroboscopic principle. The camera system may be mounted for traversing over the width of the web, so that different surface portions of the web may be monitored depending upon demand.

Frequently, it is also required to vary the spatial resolution dependent upon the circumstances when the image is captured, so that, in certain situations, a larger portion of the web may be captured with lower resolution and in other situations a detail on the web can be inspected with higher resolution. Generally, a camera with a zoom objective would be desirable for these use cases. However, zoom optics that provide a sufficient image quality and have the necessary robustness in view of the rough operating conditions in a machine such as a printing press are relatively expensive.

EP 1 940 141 A1 discloses an image capturing device having two cameras the optical systems of which are designed for different zoom factors, so that an image with low resolution can be captured with one of the cameras and an image with higher resolution can be captured in parallel with the second camera.

It is an object of the invention to provide a simple image capturing device in which the image resolution can be adjusted flexibly.

SUMMARY OF THE INVENTION

According to the invention, in order to achieve this object, the device comprises a mechanical system which is designed to vary the distance between the camera and the surface, and the optical system comprises a liquid lens having an electronical adjustable focal length.

In this device, the resolution can be adjusted, in particular also continuously, in accordance with the demand by moving the camera closer to the surface of the web or further away from this surface. The liquid lens permits to adapt the focus simply to the respectively selected object distance.

In a liquid lens, the light refracting element is formed by a lens-shaped meniscus between two liquids that are arranged between transparent electrodes and have different indices of refraction. One of the two liquids is a polar liquid, so that the contact angle of a drop formed by this liquid is dependent upon the voltage applied to the electrodes. By varying the voltage, the dimension of the drop and therewith the focal length of the lens formed by this drop may be adjusted. An example of such a liquid lens has been described in EP 2 837 957 B1.

Useful details and further developments of the invention are indicated in the dependent claims.

Since a stable and known relation exists between the voltage applied to the electrodes, the focus for a given object distance can be adjusted quickly and precisely without requiring a time-consuming and complex feedback control of the focus in a closed feedback loop.

In one embodiment, the mechanical system of the device is formed by a linear motor the stator of which extends orthogonally to the surface of which an image shall be captured and the runner of which carries the camera. Optionally, the stator may also be arranged for traversing in front of the web.

The linear motor may be a linear step motor enabling a fast and precise control of the distance between the camera and the surface of the object.

For certain use cases, for example for capturing surface areas on the web which have been printed with ink, or for capturing of glossy surface areas, a uniform and diffuse bright-sealt illumination may be desirable or necessary. In that case, a panel light may be arranged on the camera for co-movement therewith, for example in such a manner that it extends orthogonally to the optical axis of the optical system and forms an orifice for the light path of the optical system, the orifice being small in comparison to the total area of the panel light.

An embodiment example will now be described in detail in conjunction with the drawings, wherein:

DETAILED DESCRIPTION

Figure 1:
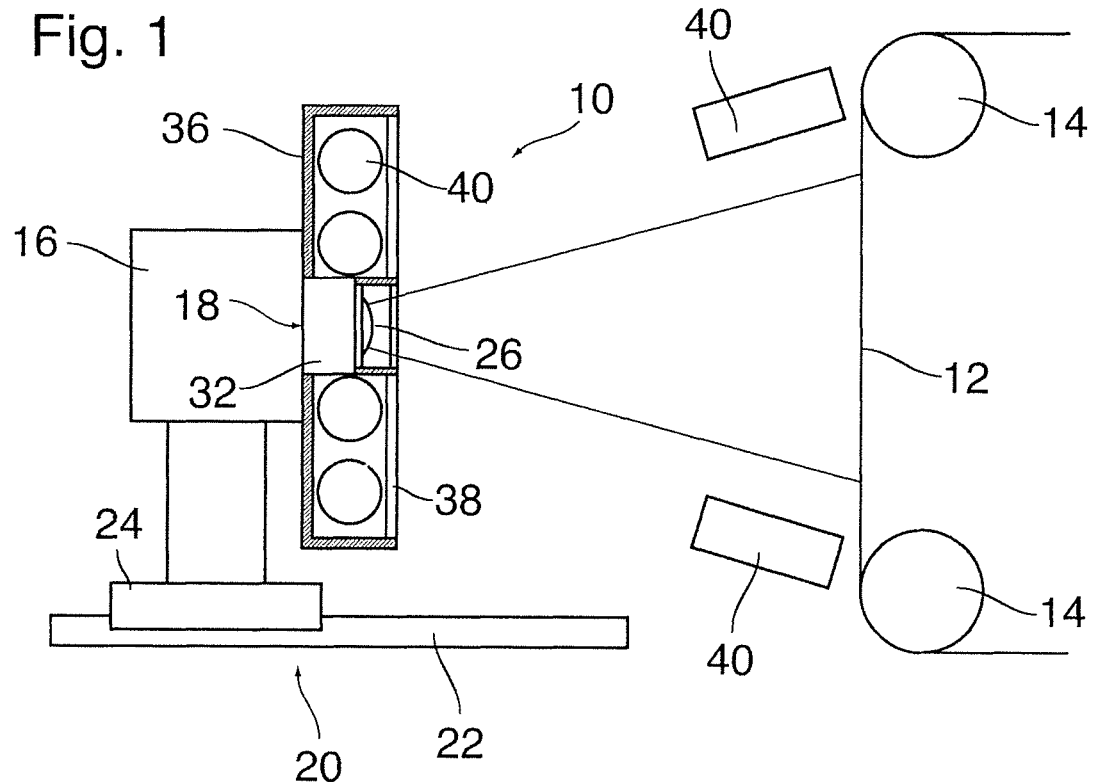
FIG. 1 is a schematical side view of a device according to the invention for capturing images of a material web.

The image capturing device 10 shown in FIG. 1 serves for capturing an image of a flat surface portion of a web 12 that is trained over deflection rollers 14. For example, the web 12 may be a media web in a printing machine.

The image capturing device 10 has a digital camera 16 with an optical system 18 as well as a mechanical system 20 with which the camera may be moved in a direction orthogonal to the plane of the web 12. In the example shown, the mechanical system is formed by a linear step motor having a linear stator 22 and a runner 24 that carries the camera 16.

In FIG. 1, the camera 16 is arranged at a relatively large distance from the web 12, so that a relatively large surface portion of the web may be captured.

Figure 2:
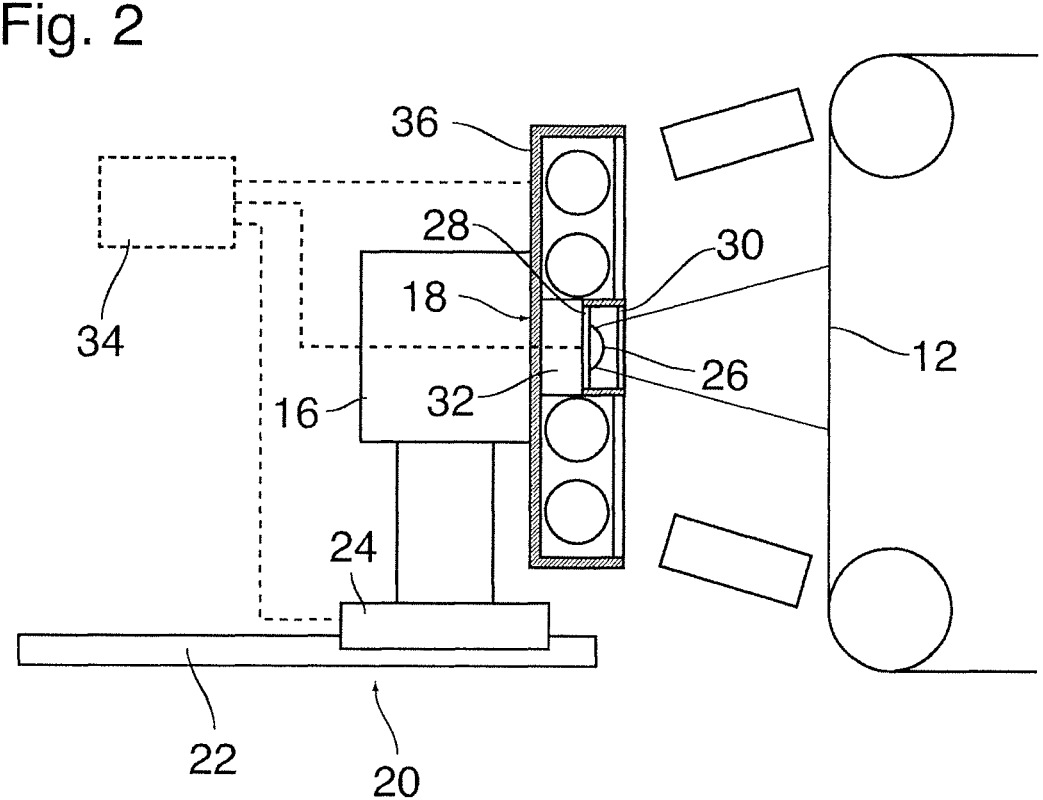
FIG. 2 shows the device according to FIG. 1 in a configuration for capturing images with higher resolution.

FIG. 2 shows the image capturing device in a condition in which the camera 16 has been moved closer towards the web 12, so that an image of a smaller surface portion of the web 12 may be captured with higher spatial resolution. In order to nevertheless form a high definition image on the sensor field of the camera 16, the focal length of the optical system 18 must be adapted. To that end, the optical system includes a liquid lens 26 the focal length of which may be adjusted electronically. As has been shown schematically in the drawing, the liquid lens is formed by two non-mixing liquids which have different indices of refraction and are enclosed in a volume between two transparent electrodes 28, 30. On one of the electrodes, the liquid having the larger index of refraction forms a droplet that constitutes the proper light-refracting element of the lens. When the voltages applied between the electrodes 28, 30 is changed, this changes the contact angle and, consequently, the curvature of the droplet. In the example shown, the contact angle of the droplet in FIG. 1 is smaller than in FIG. 2, and, thus, the droplet in FIG. 1 has a larger dimension and a smaller curvature, so that a larger focal length of the lens is achieved.

The liquid lens 26 is only one of a plurality of lenses of the optical system 18. The other lenses form a partial system 32 having a fixed focal length. For adapting the focus of the optical system to the object distance, i.e. the spacing between the camera 16 and the web 12, it is only necessary to change the focal length of the liquid lens 26 by applying a suitable voltage to the electrodes 28, 30.

An electronic control device 34 which has been shown schematically in FIG. 2 controls the linear motor of the mechanical system 20 and thereby adjusts the object distance to a value that may be input by a user. At the same time, the control device 34 controls the voltage applied to the electrodes 28. To that end, an electronic memory of the control device 34 stores a table which indicates, for each position to which the camera 16 may be adjusted, the voltage that corresponds to the necessary focal length of the liquid lens 26.

The stator 22 of the linear motor may itself be mounted for traversing movement in the printing press, so that the entire image capturing device 10 can be moved in the direction transverse to the running direction of the web 12 (normal to the plane of the drawing in FIGS. 1 and 2), for sequentially capturing images of surface portions of the web 12 that have different lateral positions.

In the example shown, the image capturing device 10 comprises a panel light 36 that is mounted on the camera 16 for co-movement therewith and permits to uniformly illuminate the surface portion of the web 12 that is to be captured by the camera with diffuse light. The panel light 36 that has been shown in a sectional view in the drawings has the shape of a rectangular flat box the dimensions of which in the directions parallel to the plane of the web 12 are preferably larger than the largest image portion to be captured by the camera 16. This box has been mounted on the camera in such a manner that it extends in parallel with the plane of the web 12 and accommodates the optical system 18 of the camera in a central orifice.

For reasons of clarity, the image capturing device 10 has not been shown to scale here. In practice, the diameter of the optical system 18 in relation to the total area of the panel light 36 is significantly smaller, so that the disturbance of the light distribution that is caused by the orifice in the panel light is negligible.

On the side facing the web 12, the panel light 36 is delimited by a translucent disk 38 that diffusely scatters the light. The other walls of the box-shaped casing of the panel light are internally lined with a wide coating that diffusely scatters the light with high reflectivity. Powerful LEDs 40 (or COBs; Chip on Board) are arranged on the side walls of the casing that are opposed to each other, such that the LEDs almost entirely exhaust the surface areas of these side walls. For example, the LEDs may be circular, with the diameter of 15 mm or more. The light emitted by the LEDs propagates in the air inside the casing of the panel light and is diffusely scattered at the walls of the casing and at the disk 38 until, eventually, it exits diffusely via the disk 38 and illuminates the image area on the web 12. The use of large powerful LEDs makes it possible to generate light flashes with high surface brightness as are required for example when coated surface areas on the web shall be detected. Thanks to the large dimensions of the panel light 36 in the directions parallel to the plane of the web 12, there is only a small change in the illumination intensity on the surface of the web when the camera is moved from the position shown in FIG. 1 into the position shown in FIG. 2. Optionally, the brightness of the panel light 36 may also be adjustable by means of the control device 34, so that the illumination strength may be precisely adapted to the respective camera position.

Since the panel light 36 moves together with the camera 16, the spatial relation to the light path in the optical system 18 remains unchanged, so that the linear movement of the camera to different positions does not cause any shadings.

In the example shown, a stationary dark-field illumination system 40 is arranged between the range of movement area of the camera 16 and the web 12, so that the camera 16 can also be used for dark-field photographies.

What is claimed is:

1. A machine for fabricating and/or processing a material web, the apparatus comprising a device for capturing images of a surface with different spatial resolutions, the device comprising:
   a camera having an optical system that can be focused onto the surface,
   a mechanical system which is designed to vary, by a linear motor, the distance between the camera and the surface,
   wherein the optical system comprises a liquid lens having an electronically adjustable focal length, and
   an electronic control device having a memory with stored predetermined values of different said focal lengths for different said distances, and configured for controlling the mechanical system to change the distance between the camera and the surface, and for transmitting to the liquid lens a voltage signal for adapting the focal length of the liquid lens to the respective position to which the camera is to be driven by the mechanical system according to the stored predetermined values.

2. The machine according to claim 1, wherein the optical system has an optical sub-system with a fixed focal length.

3. The machine according to claim 1, wherein the linear motor is a linear step motor having a stator that extends in a direction in parallel with the optical axis of the optical system and a runner carrying the camera.

4. The machine according to claim 1, wherein the linear motor of the mechanical system is a linear step motor.

5. The machine according to claim 1, wherein, for illuminating the surface, of which the image is to be captured, further comprising a panel light that is oriented in parallel with this surface and mounted on the camera for co-movement therewith.

6. The machine according to claim 5, wherein the panel light has a central opening for one of:
   the optical system,
   the light path of the optical system, or
   both the optical system and the light path of the optical system.

* * * * *